United States Patent
Saito et al.

(10) Patent No.: US 7,794,861 B2
(45) Date of Patent: Sep. 14, 2010

(54) PATTERNED MEDIA, METHOD OF MANUFACTURING MAGNETIC RECORDING MEDIUM, AND METHOD OF MANUFACTURING A BASE

(75) Inventors: Tatsuya Saito, Kawasaki (JP); Takashi Nakamura, Yokohama (JP); Shigeru Ichihara, Tokyo (JP); Toru Den, Tokyo (JP); Aya Imada, Tokyo (JP); Nobuhiro Yasui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 11/836,556

(22) Filed: Aug. 9, 2007

(65) Prior Publication Data

US 2008/0037173 A1 Feb. 14, 2008

(30) Foreign Application Priority Data

| Aug. 11, 2006 | (JP) | ............................. 2006-220560 |
| Feb. 28, 2007 | (JP) | ............................. 2007-050376 |
| May 23, 2007 | (JP) | ............................. 2007-137226 |
| Aug. 6, 2007 | (JP) | ............................. 2007-204705 |

(51) Int. Cl.
G11B 5/66 (2006.01)

(52) U.S. Cl. ..................... 428/826; 428/831; 428/836

(58) Field of Classification Search ................. None
See application file for complete search history.

(56) References Cited

U.S. PATENT DOCUMENTS

| 6,351,339 | B1 * | 2/2002 | Bar-Gadda ..................... 360/55 |
| 6,665,145 | B2 * | 12/2003 | Wada .......................... 360/133 |
| 6,982,217 | B2 | 1/2006 | Imada et al. ................. 438/584 |
| 7,534,359 | B2 * | 5/2009 | Imada et al. .................. 216/11 |
| 2004/0131890 | A1 * | 7/2004 | Kikitsu et al. ............ 428/694 B |
| 2005/0053773 | A1 | 3/2005 | Fukutani et al. ............. 428/209 |
| 2006/0144812 | A1 | 7/2006 | Imada et al. .................. 216/22 |
| 2006/0222905 | A1 * | 10/2006 | Yasui et al. ................. 428/836 |
| 2007/0259210 | A1 | 11/2007 | Ichihara et al. ........... 428/692.1 |
| 2009/0154017 | A1 * | 6/2009 | Albrecht et al. ............. 360/135 |

FOREIGN PATENT DOCUMENTS

| JP | 09-081928 | 3/1997 |
| JP | 09-297918 | 11/1997 |
| JP | 2004-066447 | 3/2004 |
| JP | 2004-335774 | 11/2004 |
| WO | WO 2004/109401 | 12/2004 |

* cited by examiner

*Primary Examiner*—Kevin M Bernatz
(74) *Attorney, Agent, or Firm*—Fitzpatrick, Cella, Harper & Scinto

(57) ABSTRACT

To provide patterned media having novel structure. Plural convex members 2991 are provided in an array form on a substrate 2990. The convex member has a shape such that the cross section at each plane in parallel to the substrate tapers toward the substrate. Magnetic recording layers 2992 are provided on upper parts 2993 of the convex members so that they are not in contact with each other between the adjacent upper surface parts.

9 Claims, 12 Drawing Sheets

# PATTERNED MEDIA, METHOD OF MANUFACTURING MAGNETIC RECORDING MEDIUM, AND METHOD OF MANUFACTURING A BASE

BACKGROUND OF THE INVENTION

1. Field of the Invention

The present invention relates to patterned media. Moreover, the present invention relates to a method of manufacturing a magnetic recording medium, and more particularly to a magnetic recording medium used for information recording media. Further, the present invention relates to a method of manufacturing a base.

2. Description of the Related Art

With recent rapid increase in information processing quantity, realization of large increase in capacity is required in magnetic recording media widely used as an information recording medium. Particularly, in hard discs, large increase in capacity and large increase in recording density have been realized until now with development of fine processing technology and signal processing technology, etc. being supported. However, nowadays, recording density is becoming close to about 200 Gbits/$in^2$ which has been considered to be physical limit from the problem of thermal fluctuation in the conventional in-plane recording system in which magnetization is recorded in a substrate in-plane direction, and increasing speed of the recording density becomes gentle. In recent years, hard discs of the system of recording magnetization in a substrate perpendicular direction which is the so-called perpendicular recording system, which has been considered to be tolerable to the problem of the thermal fluctuation have been realized as products. From this fact, it is expected that further improvement in the recording density will be realized also in future.

However, for realization of higher density in future, increase in noise becomes a large problem. Namely, there is the problem that unevenness of shape and size of magnetic particle constitutes cause of noise followed by reduction of recording bit based on realization of high recording density to deteriorate recording/reproducing characteristic. To solve this problem, it is considered that reduction in exchange interaction between adjacent magnetic particles, and miniaturization of size and realization of uniformness of shape of magnetic particle are effective.

Particularly, a medium in which control is performed to the extent of arrangement of magnetic particles by making use of fine processing technology so that magnetic particles which are uniform in shape and size are regularly arranged is called a patterned medium. Thus, attention is drawn to the fact that ultra-high density medium having the recording density of the order of 1T bits/$in^2$ can be realized.

To prepare such a patterned medium, there is mentioned a method of implementing processing such as etching, etc. to magnetic layer to prepare regularly arranged magnetic particles which are uniform in shape and size (Japanese Patent Application Laid Open No. H9-297918).

However, there are instances where the magnetic layer is etched so that the magnetic layer may be damaged.

SUMMARY OF THE INVENTION

In view of the above, an object of the present invention is to provide novel patterned media and a method of manufacturing magnetic recording medium in which there is no necessity to separate magnetic layers by etching. In magnetic recording media, there are also included a magnetic recording layer used for the so-called hard disc drive and/or a magnetic memory such as quantum dots, etc.

Further, manufacturing methods described below are also included in the present invention.

The present invention is directed to a patterned medium comprising magnetic recording layers, wherein plural convex members are provided in an array form on a substrate, each of the convex members has a shape such that cross section at each plane in parallel to the substrate tapers toward the substrate, and the magnetic recording layers are provided on upper surface parts of the convex members in a manner that the upper surface parts adjacent to each other are not in contact with each other.

The convex member can be comprised of oxide, resin or metal.

The convex member can have a height less than 30 nm. The convex member can have a height from 5 nm to 29 nm.

The difference in level between the adjacent upper surface parts can be less than 5 nm.

In the patterned medium, an orientation film can intervene between the magnetic recording layer and the upper surface part of the convex member.

In the patterned medium, a soft magnetic under layer can be provided between the substrate and the convex member.

The magnetic recording layer can be not provided on the side surface of the convex member.

In the patterned medium, a material comprised in the magnetic recording layer can be provided on the substrate between the convex members.

The present invention is directed to a method of manufacturing a base, comprising the steps of: preparing on a substrate a member comprised of an underlying layer and a layer to be anodized in this order from the substrate side; forming by anodization a hole in the member and the oxide of the underlying layer and making the member grow toward the outside of the member within the hole; enlarging the opening diameter of the hole; and additionally anodizing the member to make the oxide of the underlying layer further grow toward the outside of the member within the hole.

The forming step of the oxide by anodization and the enlarging step of the hole diameter can be repeated.

The shape of the oxide growing within the hole can be such that cross sections in parallel to the substrate of the oxide taper toward the substrate.

The oxide can have an inverse-taper shape.

In the method of manufacturing a base, a magnetic film can be provided on the oxide.

The anodized layer existing between the oxides can be removed after or before a magnetic film is provided on the oxide.

The present invention is directed to a method of manufacturing a base, comprising the steps of: preparing on a substrate a member comprised of an oxide layer between which layer and the substrate an intermediate layer intervenes; forming a groove the member at a predetermined interval to expose side surfaces of the intermediate layer and anodizing the side surfaces to swell each of the side surfaces; and embedding a filler into the groove to obtain a base comprised of a part having a shape tapered toward the substrate side.

The member can be comprised of a first substrate, a first oxide layer, the intermediate layer and a second oxide layer as the oxide layer from the substrate side.

The present invention is directed to a method of manufacturing a base, comprising the steps of: disposing on a substrate a layer of a material capable of being swelled by oxidation; providing on the layer convex members tapered in a direction away from the substrate; and oxidizing the layer to grow an oxide of the material between the convex members.

The convex members can be formed by an in-print method.

In the method of manufacturing a base, a magnetic film can be deposited on the oxide after the oxide of the materials grown.

The convex member can be removed after the magnetic film is deposited.

The magnetic film can be formed on the oxide after the convex members are removed.

The present invention is directed to a method of manufacturing a magnetic recording medium, comprising the steps of: forming on a substrate convex members tapered toward the substrate by an in-print method; and providing a magnetic layer for magnetic recording on the upper surface side of the convex members.

In the method of manufacturing magnetic recording medium, an orientation layer can intervene between the convex member and the magnetic layer.

The present invention is directed to a method of manufacturing a magnetic recording medium comprising the steps of: providing an underlying layer on a substrate and a porous film on the underlying layer; growing an oxide of the underlying layer perpendicularly from a bottom of the porous film; removing at least a portion of the porous film to provide on the substrate the underlying layer and convex members comprised of an oxide of the underlying layer; and disposing a magnetic film above the projection.

The underlying layer can contain at least one element selected from the group consisting of Ti, Zr, Hf, Nb, Ta, Mo, and W.

The providing step of the porous film can be comprised of the steps: forming a layer to be anodized on the underlying layer; and anodizing the layer to be anodized to turn the layer into the porous film.

The providing step of the porous film can be comprised of the steps: disposing a phase separation film on the underlying layer; and removing one phase of the phase separation film to provide the porous film.

In accordance with the present invention, there are provided novel patterned media, and a novel manufacturing method for a magnetic recording medium, etc.

In addition, in accordance with the present invention, magnetic films spatially separated can be provided.

It should be noted that if the convex member is caused to have inverse taper shape, attachment quantity of magnetic materials to the side surface of the convex member can be reduced.

Further features of the present invention will become apparent from the following description of exemplary embodiments with reference to the attached drawings.

Figure 1:
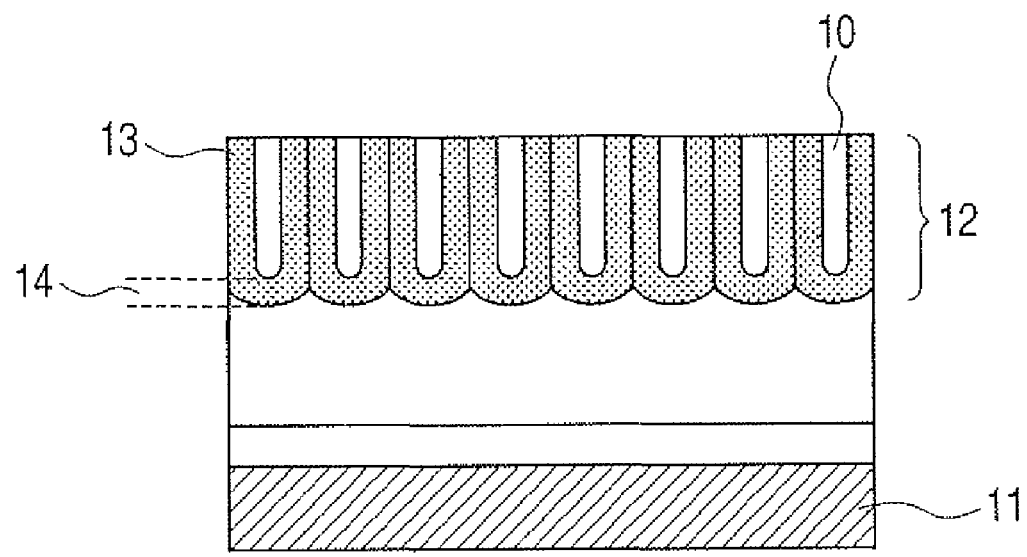
FIG. 1 is a model view illustrating cross section of porous film obtained by anodic oxidation.

In the drawings, reference numeral 10 indicates hole, reference numeral 11 indicates substrate, reference numeral 12 indicates porous film, reference numeral 13 indicates oxide of anodic-oxidized layer, reference numerals 14, 20 indicate barrier layer, and reference numeral 21 indicates underlying layer.

Reference numeral 22 indicates porous film, reference numeral 23 indicates oxide of underlying layer, reference numeral 24 indicates hole, reference numeral 25 indicates projection, reference numeral 26 indicates substrate, reference numeral 27 indicates bottom part of porous film, and reference numerals 28, 29 indicate magnetic material;

Reference numeral 30 indicates intermediate layer, reference numeral 31 indicates MgO, reference numeral 32 indicates FePt, reference numeral 33 indicates oxide of Nb, reference numeral 34 indicates projection, reference numeral 101 indicates underlying layer, reference numeral 102 indicates anodic-oxidized layer, reference numeral 103 indicates substrate, reference numeral 104 indicates oxide of underlying layer, reference numeral 105 indicates member, and reference numeral 106 indicates hole;

Reference numeral 107 indicates protective layer, reference numeral 109 indicates intermediate layer, reference numeral 110 indicates oxide layer, reference numeral 111 indicates mold, reference numeral 112 indicates mold convex part, reference numeral 113 indicates recessed structure, reference numeral 114 indicates mold recessed part, reference numeral 115 indicates convex structure, reference numeral 116 indicates transfer layer, reference numeral 117 indicates magnetic recording layer, and reference numeral 118 indicates sealing member.

DESCRIPTION OF THE EMBODIMENTS

Embodiments of the present invention will now be described.

First Embodiment: Patterned Medium

A patterned medium caused to be of the configuration including magnetic recording layers of this embodiment has features as described below.

First, plural convex members are provided in an array form on a substrate, and the convex member has shape such that the cross section at each plane in parallel to the substrate tapers toward the substrate (inverse taper shape). Further, the magnetic recording layers are provided on the upper surface parts of the convex members so that they are not in contact with each other between the adjacent upper surface parts.

Figure 20:
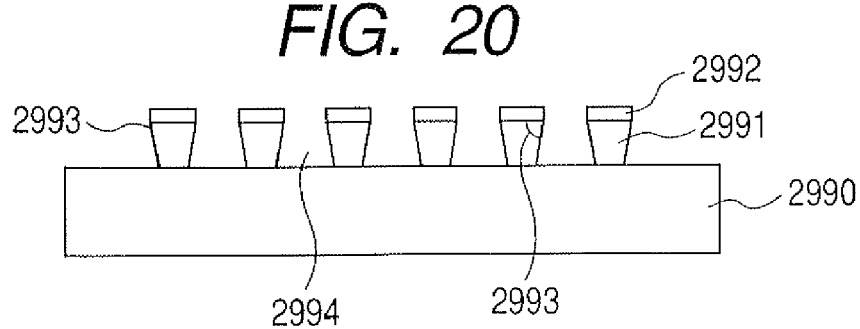
FIG. 20 is a view illustrating an embodiment of a patterned medium caused to be of the configuration including magnetic recording layers of the present invention.

Specifically, description will be given with reference to FIG. 20. In FIG. 20, reference numeral 2990 indicates substrate, reference numeral 2991 indicates convex member, and reference numeral 2992 indicates magnetic film on the member. As occasion demands, different layers for various objects may be interposed between the substrate and the convex member, or between the member and the magnetic film. Reference numeral 2993 indicates upper surface part of the convex member 2992. The arrangement in an array form is the configuration including not only the arrangement in which convex members are equidistantly arranged within all areas, but also an arrangement such that they are arranged in line only within a portion of the area on the substrate.

When such a configuration is employed, it is possible to spatially separate the magnetic recording layers, and the magnetic film is difficult to be attached onto the side surface of the convex-shaped part by making use of inverse taper shape. Here, although material of the convex member is not particularly limited, metal, oxide or resin (optically hardening resin, thermally hardening resin and thermal-plastic resin, etc.) may be suitably used. As the oxide, there can be used metal or alloy which is oxidized by anodic oxidation process.

It is desirable that the convex member has a height less than 30 nm. Particularly, in the case where soft-magnetic under layer is provided below the member and on the substrate, it is suitable that the height of the member is caused to be low for the purpose of effectively utilizing high permeability of the soft magnetic under layer. Although the lower limit of the convex member is not particularly limited, the height of the convex member can be within the range from 5 nm to 29 nm.

Moreover, it is desirable that the adjacent convex members have height equal to each other so that difference between heights of upper surface parts of adjacent convex members is less than 5 nm.

It is to be noted that the magnetic recording layer may be provided on the upper surface part of the convex member through orientation film (film for orienting magnetic layer thereon). The orientation film includes, e.g., MgO or platinum.

A soft magnetic under layer may be provided between the substrate and the convex member. Although it is preferable that no magnetic recording layer is provided on the side surface of the convex member having inverse taper shape, the invention of this embodiment is not necessarily limited to such state.

Moreover, material constituting the magnetic recording layer may be provided on the substrate between the plural convex members. Such material may be removed as occasion demands.

It is to be noted that angle 2933 of the inverse-taper part is within the range from 45 degrees to less than 90 degrees, preferably within the range from 60 degrees to 80 degrees.

Further, in the case where magnetic film 2992 is formed as film by the sputtering process, etc., it is desirable that material constituting the magnetic film is not attached onto the side surface of the convex-shaped part 2991.

It should be noted that the invention according to this embodiment does not exclude the case where magnetic film is attached to parts 2994 between the convex-shaped parts 2991. Such convex-shaped material may be prepared by using, e.g., optical in-print method or thermal in-print method, etc. as described later.

Patterned media in which projections having inverse taper shape are disposed at predetermined intervals as in the case of the present invention are extremely useful.

Such patterned media may be utilized as magnetic recording medium (medium of hard disc, or magnetic memory including quantum dots, etc.).

In addition, it is a matter of course that gap between convex-shaped parts may be filled with non-magnetic material as occasion demands (FIGS. 13A to 13E).

Second Embodiment: FIGS. 12A to 12G, and

The invention relating to a method of manufacturing a base according to this embodiment has features as described below.

First, there is used a member including an underlying layer and an anodic-oxidized layer on a substrate in order recited from the substrate side. Further, holes are formed by anodic oxidation process at the member, and oxide of the underlying layer is grown toward the outside of the member within the hole. Thereafter, hole diameter of the hole is enlarged to further allow the member of which hole diameter has been extended to undergo anodic oxidation process. By this anodic oxidation process, oxide of the underlying layer can be further grown toward the outside of the member within the hole.

By such a method, it is possible to dispose, on the substrate, oxide having inverse-taper shape tapered stepwise strictly speaking.

In this example, producing of oxide of the underlying layer by the anodic oxidation process and a treatment for enlarging the hole diameter are repeated, thereby enabling realization of step-shaped side surface.

Further, it can be said that shape of oxide of the underlying layer growing within the hole is such that the cross section in a direction in parallel to the substrate plane of the oxide tapers toward the substrate.

It can be also said that the oxide has inverse taper shape. A magnetic film may be provided on the oxide through orientation film as occasion demands.

After magnetic film is provided on the oxide, or before magnetic film is provided on the oxide, it is possible to remove anodic-oxidized layer, which has been caused to undergo anodic oxidation process, existing between oxides of the plural underlying layers formed on the substrate.

Third Embodiment: FIG. 14

A method of manufacturing a base according to this embodiment has features described below. First, a member including oxide layer is prepared on a substrate through an intermediate layer. Further, grooves are formed at the member so that the side surfaces of the intermediate layer are exposed at predetermined intervals to perform anodic oxidation process so that the side surface of the intermediate layer is swollen. Thereafter, fillers are embedded into the grooves, thereby enabling manufacture of a base having taper shaper part toward the substrate side.

Here, the above-mentioned member may be caused to be of the configuration including, on the substrate, a first oxide layer, the intermediate layer and a second oxide layer serving as the oxide layer from the substrate side.

Fourth Embodiment: FIGS. 15A to 15D, FIG. 16

A method of manufacturing a base according to this embodiment has features described below. First, a layer including material of which volume is expanded by oxidation process is disposed on a substrate, and plural convex members having tapered shape in a direction away from the substrate are provided. Further, a process to expose the layer to parts between the convex members is implemented as occasion demands thereafter to allow the layer to undergo oxidation process to thereby grow oxide of the material between the convex members. Since oxide can be grown along shape of the convex member by such a member, a base where plural members having inverse taper shape are disposed on the substrate is resultantly manufactured.

In this embodiment, the convex member on the substrate may be formed by the so-called in-print method. As the in-print method, thermal in-print, optical in-print and soft in-print may be applied. It is a matter of course that formation of the convex member is not limited to the in-print method, there may be used lithography, etc.

Moreover, after oxide of the material is grown, magnetic film may be deposited on the oxide. As occasion demands, magnetic film is deposited through orientation film.

It is to be noted that the magnetic film may be deposited thereafter to remove the convex member, or the convex member may be removed thereafter to form the magnetic film on the oxide.

Figure 17A:
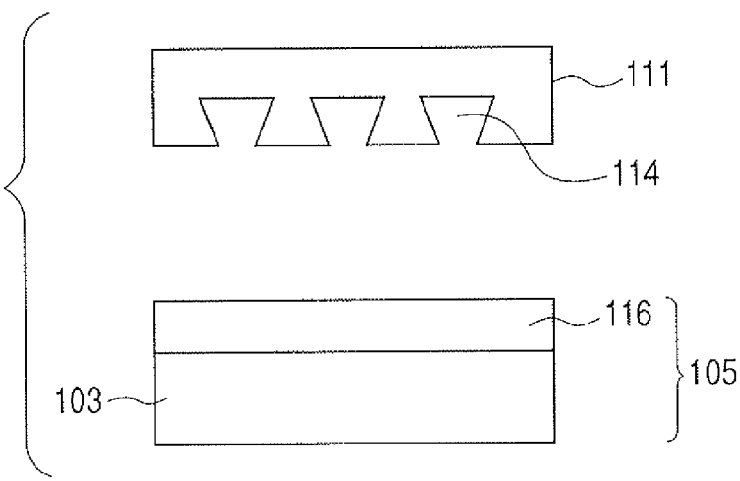
FIGS. 17A and 17B are process diagrams illustrating a manufacturing method of providing convex structure of which width is enlarged toward the outside of member by in-print method of a ninth example of the present invention.
Figure 17B:
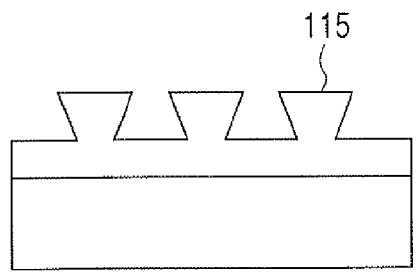
Figure 18:
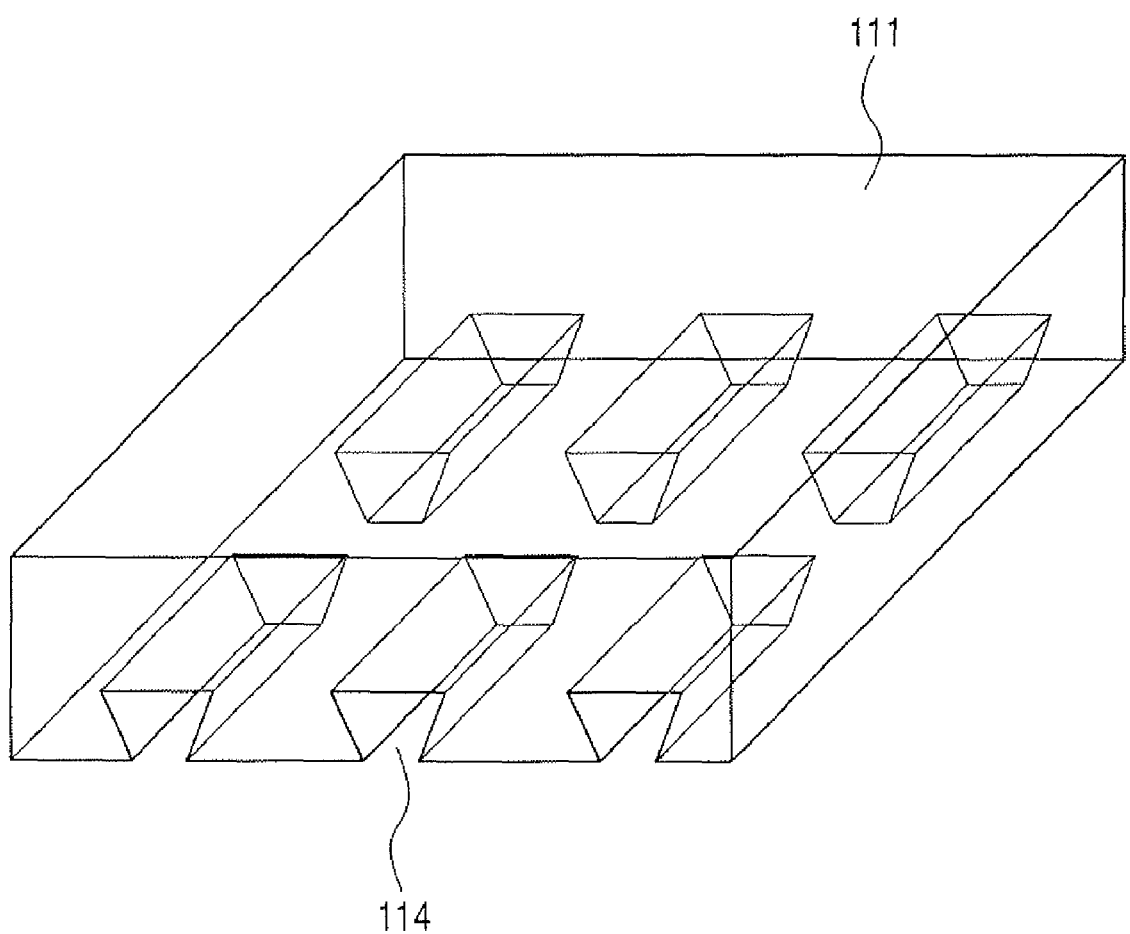
FIG. 18 is a perspective view of mold used in the ninth example of the present invention.

Fifth Embodiment: FIGS. 17A, 17B and FIG. 18

A method of manufacturing a magnetic recording medium according to this embodiment is directed to the magnetic recording medium manufacturing method having features as described below. Specifically, plural convex members each having a tapered shape toward the substrate side (this shape may be also referred as inverse taper shape) are formed on the substrate by using the in-print method. The convex members may be arranged in dot form, or line form, and may be arranged in form where dot form and line form are mixed, and is not particularly limited.

Further, a magnetic layer for magnetic recording is provided on the upper surface side of the convex member through an orientation film as occasion demands. The convex member (e.g., may be formed by hardening optical hardening resin or thermal hardening resin) may be formed by the so-called in-print method. As the in-print method, thermal in-print, optical in-print and soft in-print may be also applied. It is to be noted that there is conceivable the case where, depending upon shape of mold (template) used in in-print, mold is difficult to be released from resin hardened along the pattern of the mold. In such a case, resin may be released from mold while interposing release agent between mold and resin, or heating as occasion demands. Particularly, resin may be released from mold by making use of elasticity of resin. In this case, in connection with a method of preparing inverse-taper shape by the in-print method, such a technology is described in the Japanese Patent Application Laid Open No. 2004-335774.

Specifically, there is described "that first, resist layer (e.g. layer including polymethyl glutarimide which is polyimide-based thermoplastic resin) is formed on a substrate. The resist layer of polymethyl glutarimide is coated by using spin coater, etc. on the substrate so that its film thickness becomes equal to 0.4 µm. Next, the substrate on which film of polymethyl glutarimide has been made is heated for 60 seconds on a hot plate heated so that its temperature is 150° C. to dry it. Thus, such resist layer is formed. Next, mold having projections corresponding to pattern to be formed is pressed from the resist layer side in the state where the substrate on which the resist layer is formed is heated on the hot plate. As the press condition at this time, a setting can be made such that heat temperature is 130° C., pressing pressure is 100 MPa and pressing time is five minutes. In this case, the convex-shape of the mold may be such that the side wall is formed in inverse-taper form. Moreover, the shape of the convex part is set to a shape such that the front end of the convex part reaches the substrate by taking resist film thickness into consideration. Further, in performing press, press is carried out in the state where no damage is given onto the substrate. Next, after cooling down to ordinary temperature, mold is released from the resist layer. At the resist layer pressed by mold, there is formed a resist pattern in which side walls of recessed part following the convex part having side walls of inverse tapered shape of the mold are molded in inverse taper form." The technology described in the above-mentioned Japanese Patent Application Laid Open No. 2004-335774 can be applied to the invention of this embodiment.

In addition, the magnetic layer may be provided on the convex member through an orientation layer. A magnetic layer may be formed as film on the convex member thereafter to fill grooves at the member, or to laminate coplanar layer, etc. on the magnetic layer.

The mold described in FIG. 17A is manufactured in a manner as described below, for example. Namely, convex parts having the same shape as mold recessed part 114 are formed on a metallic substrate by the photolithography and the etching process to harden polydimethylsiloxane, etc. thereon thereafter to allow material having elasticity to flow thereinto to harden the material thus obtained.

As described in the first to fifth embodiments, magnetic recording layers are provided on the upper surface side of the convex member having a cross sectional shape tapered toward the substrate side, thereby enabling spatial separation of the magnetic recording layers from each other. Particularly, since shape of inverse taper is employed so that magnetic film can be difficult to be attached to the side wall of the member, influence such as noise, etc. resulting therefrom can be reduced.

In the case where pillar structure based on orientation of crystal particles is utilized as underlying convex structure, there is the possibility that the underlying film becomes thick in order to provide sufficiently isolated pillar structure so that no effect is provided in the case where soft magnetic under layer is inserted. Further, there are instances where there is unevenness in heights of crystal particles so that floating of the magnetic head may become difficult. In addition, there takes place unevenness in the particle diameters themselves of crystal particles. Thus, it is deemed that application to patterned media for recording one bit onto one crystal particle would be difficult. Accordingly, also as compared to Japanese Patent Application Laid-Open No. H09-81928, the invention of this embodiment is extremely useful. In the technology of Japanese Patent Application Laid-Open No. H09-81928, it is difficult that inverse taper shape is formed as tapers coincide in shape between respective convex members with respect to the shape. However, in accordance with the present invention of the above-described embodiments, it is possible to provide a structure having inverse tapered shapes which are aligned with each other.

It should be noted that matters which have been described in the respective embodiments can compliment the descriptions of individual embodiments with each other as long as they are not contradictory to each other, and embodiments described below may be applied to the respective embodiments as occasion demands.

It is to be noted that size, density and inclination of taper part of inverse tapered member which have been described in the above-described first to fifth embodiments are not particularly limited.

Taking one example, when grasped as a top view viewed in a substrate direction, the convex member has size of 20 nm to 100 nm in longitudinal direction, and has size of 10 nm to 80 nm in lateral direction.

The density of the convex member is, e.g., 15 nm to 150 nm in terms of average interval.

When an angle that the upper surface of the convex member and taper part form is assumed as θ, inclination (angle) of the inverse taper part is $45° \leq \theta < 90°$. From a viewpoint of allowing magnetic film to be difficult to be formed on the side wall, such angle is preferably $60° \leq \theta \leq 80°$.

Further, the technical matters described in the sixth embodiment may be applied as occasion demands in the first to fifth embodiments as long as they are not technically contradictory.

Sixth Embodiment: FIGS. 1 to 11

A method of manufacturing a magnetic recording medium according to this embodiment has the feature including following process steps.

Namely, this method includes: providing an underlying layer on a substrate and providing a porous film on the underlying layer; growing, in a direction perpendicular to the substrate, oxide of the underlying layer from a bottom part of the porous film; and removing at least a portion of the porous film to provide, on the substrate, a projection including oxide of the underlying layer while remaining the underlying layer.

Further, this method includes: disposing a magnetic material on the upper part of the projection. Thus, a magnetic recording medium is manufactured.

Here, the providing of the porous film is realized by forming an anodic-oxidized layer on the underlying layer, and allowing the anodic-oxidized layer to undergo anodic oxidation process to provide the porous film.

Alternatively, the providing of the porous film is realized by disposing a phase separation film on the underlying layer, and removing one phase of the phase separation film to provide the porous film. This phase separation film will be described later.

In a direction perpendicular to the substrate, oxide of the underlying layer can be grown on one of the bottom part of the position of hole of the porous film and the bottom part of the position of the hole and the bottom part of the hole of the porous film. The underlying layer can be a layer containing at least one element selected from the group consisting of Ti, Zr, Hf, Nb Ta, Mo and W.

Growing of oxide of the underlying layer on the bottom part of the hole of the porous film in a direction perpendicular to the substrate can be performed by anodic oxidation.

Electrolytic solution used in the anodic oxidation can be ammonium borate, ammonium tartrate or ammonium citrate.

After anodic oxidation is performed in the electrolytic solution to grow oxide of the underlying layer on the bottom part of the hole of the porous film in a direction perpendicular to the substrate, the porous film or the porous film and the surfaces of oxide of the underlying layer can be polished.

The removing of the porous film can be performed by wet etching. Oxide of the underlying layer can be caused to undergo heat treatment under oxidation atmosphere.

The disposing of magnetic material on the upper part of the projection can be performed by a film formation process to fly film formation particle having directivity with respect to the substrate.

Disposing an orientation layer between the projection and the magnetic material can be included.

First, the method of manufacturing magnetic recording medium according to this embodiment includes process steps described below: disposing an underlying layer on a substrate and disposing an anodic-oxidized layer on the underlying layer; allowing the anodic-oxidized layer to undergo anodic oxidation to provide a porous film; and growing oxide of the underlying layer on the bottom part of the porous film in a direction perpendicular to the substrate. These process steps are called "anodic oxidation process step".

Further, this manufacturing method includes: removing the anodic oxide film to provide, on the substrate, a projection of oxide of the underlying layer while remaining the underlying layer (referred to as "providing of projection"), and disposing a magnetic material on the upper part of the projection (referred to as "disposing of magnetic material").

Here, the embodiment of the present invention will be described in the state classified into three process steps of "1. anodic oxidation process step", "2. process step to provide projection" and "3. process step to dispose magnetic material".

(1. Anodic Oxidation Process Step)

There is prepared a sample in which an underlying layer is disposed on a substrate and an anodic-oxidized layer is disposed thereon by thin film formation process such as sputtering. As the underlying layer, there is disposed a material containing at least one element selected from the group consisting of Ti, Zr, Hf, Nb, Ta, Mo and W. Moreover, as the anodic-oxidized layer, there is disposed Al or alloy containing Al as main component. This anodic oxidation process may be performed in electrolytic solution.

Next, when the sample is caused to undergo anodic oxidation by using acid aqueous solution such as phosphorous acid, oxalic acid or sulfuric acid, etc., there is provided a porous film 12 in which a large number of holes 10 has grown from the sample surface in a direction perpendicular to the substrate 11 as shown in FIG. 1. The structure of the porous film 12 includes very small holes 10, and oxide 13 of the anodic-oxidized layer surrounding them, wherein particularly oxide layer formed on the bottom part of the hole 10 is called barrier layer 14. It is known that the thickness (nm) of the barrier layer 14 is empirically expressed as 1.2×V with respect to voltage V of anodic oxidation. Moreover, holes of the porous film are produced from random positions of the sample surface. In this case, when very small concave parts serving as the starting point on the sample surface are prepared by the electron beam painting or nano in-print, etc., holes are produced only from the position of the starting point. Namely, there may be also provided a porous film having holes regularly arranged in correspondence with the arrangement pattern of concave parts. In this instance, the fact that the anodic oxidation voltage V (Volt) is caused to be anodic oxidation voltage V in which interval (nm) of the regular arrangement is equal to 2.5×V is preferable in obtaining a porous film having highly regulated holes.

In order to obtain the porous film as described above, it is typically performed that Al is used as anodic-oxidized film. This is because although there exists material forming porous film by anodic oxidation as material except for Al such as Si or Ti, etc., there are problems or difficulties that vertical property of hole is not so good, and hydrofluoric acid is used as acid aqueous solution, etc. as compared to anode oxidation of Al. Moreover, the inventors have found that if any Al alloy containing at least one element selected from the group consisting of Ti, Zr, Hf, Nb, Ta, Mo and W is employed, anodic oxide film including holes having good vertical property similarly to Al may be formed. In this case, Al is caused to be changed into alloy, thereby enabling reduction of roughness of film surface resulting from hillock or grain boundary. For this reason, such an approach is particularly effective in preparing very small concave part serving as the starting point of anodic oxidation on the sample surface. It is preferable that, although depending upon kind of element to be added, addition quantity of element with respect to Al is approximately within the range from 5 atomic % to 50 atomic % in order to form porous oxide film including hole having good vertical property similarly to Al.

Figure 2:
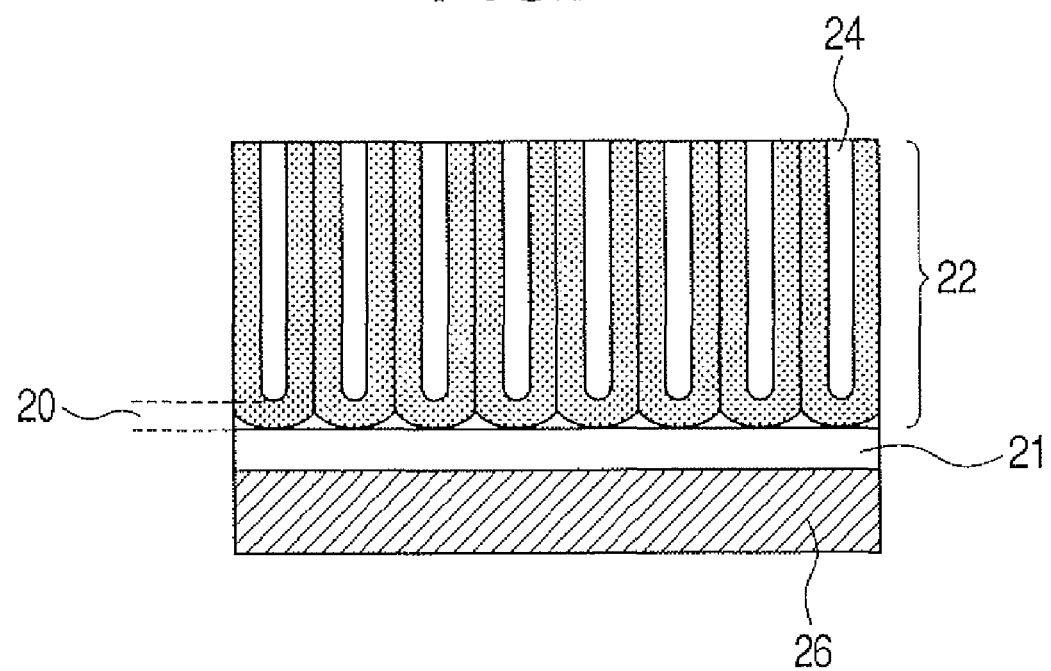
FIG. 2 is a model view illustrating cross section of porous film obtained by anodic oxidation.

Subsequently, anodic oxidation is continued so that porous film grows from the sample surface toward the substrate direction, and the porous film 22 grows until the bottom part of the barrier layer 20 reaches the underlying layer 21 as shown in FIG. 2. In this instance, there is disposed, as material of the underlying layer 21, material containing at least one element selected from the group consisting of Ti, Zr, Hf, Nb, Ta, Mo and W. As a result, the inventors have found that oxide 23 including element constituting underlying layer from the underlying layer 21 toward hole 24 grows on the bottom part 27 of the porous film as shown in FIG. 3.

Figure 3:
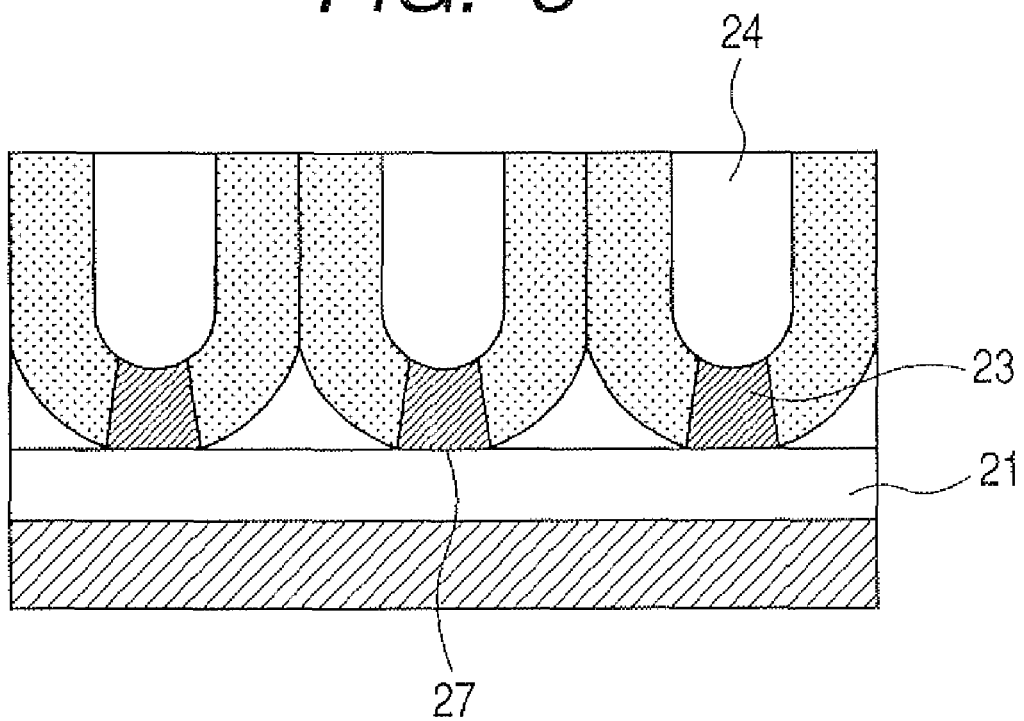
FIG. 3 is a model view illustrating the state where oxide of underlying layer has grown at barrier layer of porous film.
Figure 4:
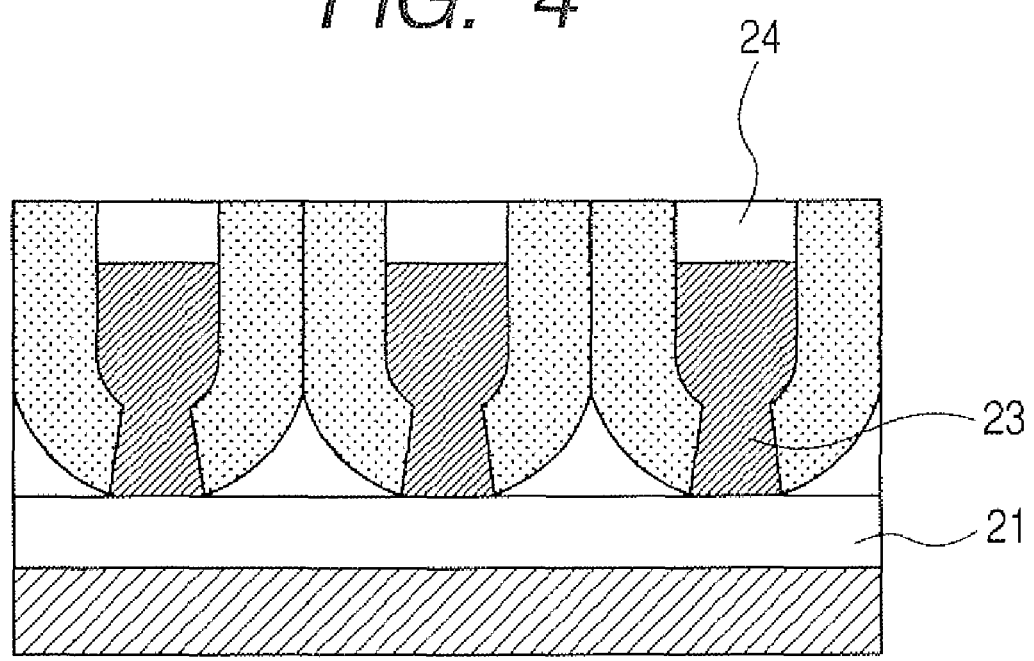
FIG. 4 is a model view illustrating the state where oxide of underlying layer has grown into hole of the porous film.

Moreover, from the state of FIG. 3, electrolytic solution is changed into an electrolytic solution in which barrier type anodic oxide film is provided, such as, for example, ammonium borate, ammonium tartrate, ammonium citrate, etc. to perform anodic oxidation. It is more preferable that such an approach is employed to grow oxide 23 of the underlying layer while filling it into the holes 24 of the anodic oxide film as shown in FIG. 4.

(2. Process Step for Providing Projection)

The process step for removing the porous film obtained by anodic oxidation to provide projection will now be described. As shown in FIG. 3 or 4, a sample in which oxide of the underlying layer has grown is immersed into acid or alkali to thereby perform wet-etching. In this instance, etching is performed in such a manner to selectively dissolve and remove only oxide of the anodic-oxidized layer by making use of difference of etching tolerances between oxide of anodic-oxidized and oxide of the underlying layer so that oxide of the underlying layer is left as projection. Since the oxide of the anodic-oxidized layer includes alumina which is oxide of mainly containing Al and has very intolerable property with respect to alkali, it is possible to easily remove oxide of anodic-oxidized layer by making use of NaOH or KOH, etc. Moreover, there is conceivable the case where it is difficult to selectively dissolve and remove only oxide of anodic-oxidized layer depending upon material for forming oxide of the underlying layer. For example, in the case where W is employed as the underlying layer, etc., there takes place the problem in which not only oxide of anodic-oxidized layer, but also oxide or acid of W would be dissolved by acid or alkali. In such a case, if oxide of the underlying layer is caused to undergo reducing by heat treatment, etc. in vacuum thereafter to perform wet etching, only oxide of the anodic-oxidized layer can be selectively dissolved and removed.

Figure 5:
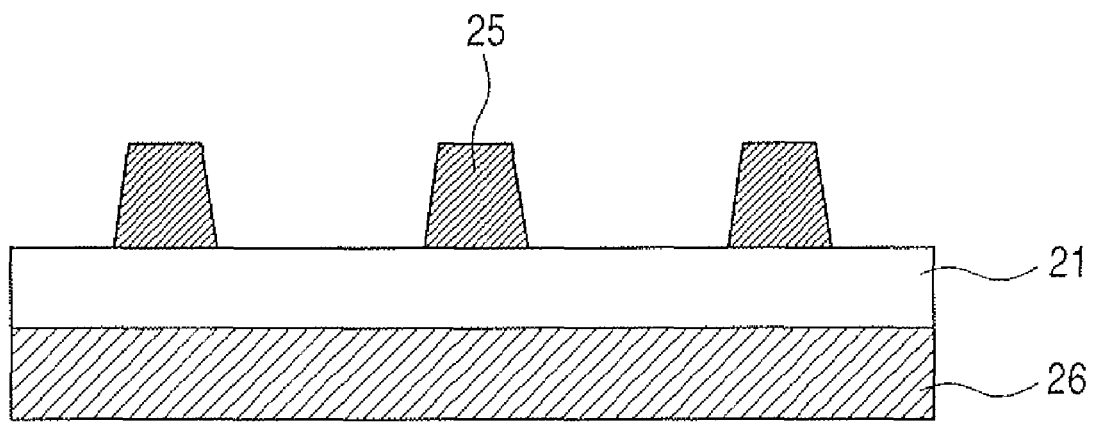
FIG. 5 is a model view illustrating regularly arranged projections including oxide of underlying layer.

Namely, if there is formed a porous anodic film having regularly arranged holes in the anodic oxidation process, it is possible to provide a structure including regularly arranged projections 25 including underlying layer 21 and oxide of the underlying layer on the substrate 26 as shown in FIG. 5.

The etching tolerance between alumina of anodic-oxidized layer and oxide of the underlying layer will be described in more detail.

The alumina formed by anodic oxidation is classified into $\gamma$-$Al_2O_3$ as crystallographic property. The $\alpha$-$Al_2O_3$ is alumina having satisfactory crystallinity, whereas the $\gamma$-$Al_2O_3$ is alumina having bad crystallinity. The chemical property is such that according as the crystallinity becomes bad, etching is very easily performed with respect to acid or alkali. Therefore, the $\gamma$-$Al_2O_3$ is very easily etched with respect to weak acid, e.g., phosphorous acid, etc. While oxide of the underlying layer is made as barrier type anodic-oxidized film, etching tolerance with respect to acid and etching varies depending upon kind of element of the underlying layer, and valence number that element in oxide can take. For example, Ta oxide is insoluble for acid, and also has etching tolerance with respect to alkali. Further, Nb oxide, e.g., NbO including bi-valence Nb is soluble with respect to acid or alkali, but $NbO_2$ or $Nb_2O_5$ having higher oxidation number of four or five valences is insoluble with respect to acid, and etching tolerance is improved also with respect to alkali.

By paying attention to etching tolerance of oxide, and further selecting kind and concentration of etching solution and immersing time, it is possible to form projection.

On the other hand, in the case where convex-shaped oxide including barrier type anodic-oxidized film which can take oxide having plural kinds of valence numbers is material which can take oxide having several kinds of valence numbers, the following point is reported. Namely, it is reported that the valence number of the surface of projection and that of the inside thereof are different from each other, and oxide having large valence number is formed at the outer peripheral part, but the oxidation number within the projection is lowered. Moreover, etching tolerance of oxide is greatly affected due to containing of oxide based on electrolytic solution during anodic oxidation, crystal defect and/or influence based on taking-in of bonding water, etc., and also affects strength of projection finally made.

In this embodiment, when barrier type anodic-oxidized film is prepared to perform heat treatment within oxidation atmosphere, impurity such as bonding water, etc. in the underlying layer oxide is removed so that there is provided oxide having higher oxidation number and etching tolerance is enhanced. By performing heat treatment under the oxide atmosphere, the strength of projection is improved. Thus, there is provided a desirable form as a magnetic recording medium using projection structure.

With respect to temperature of heat treatment, the etching tolerance is improved to more degree according as temperature becomes high. In this case, crystallinity of alumina which is porous film to be removed is also gradually improved from $\gamma$-Al$_2$O$_3$, and becomes difficult to be dissolved with respect to acid or alkali. Moreover, soft magnetic under layer is given between the underlying layer 21 and the substrate of FIG. 2 to form a perpendicular recording medium. In this case, it is necessary to take into consideration characteristic deterioration of the soft magnetic under layer based on heating. Under the above condition, heating temperature is 200° C. to 400° C., preferably 250° C. to 350° C. When temperature is less than 200° C., effect of heat treatment cannot be sufficiently exhibited. On the other hand, when temperature is high temperature of 400° C. or more, the characteristic of the soft magnetism is deteriorated.

The heat treatment may be performed either after barrier type anodic-oxidized is prepared, or after aluminum is etched. However, etching condition of alumina to be selected varies depending upon employment of either one of process steps.

In the case where oxide of the underlying layer has grown in the state of FIG. 3 in "1. Anodic oxidation process step", the shape of projection 25 obtained is pillar-shaped. Since its height is determined by the thickness of the barrier layer formed by anodic oxidation, and the diameter is determined by hole diameter of porous film formed by anodic oxidation, all the projections have uniform height and diameter.

On the other hand, in the case where oxide of the underlying layer is grown into the hole of the porous film in the state of FIG. 4 in "1. Anodic oxidation process step", the height of the projection 25 is determined by anodic oxidation voltage in growing oxide of the underlying layer into the inside of hole of the porous film. The diameter is determined by hole diameter of the porous film in growing oxide of the underlying layer within the holes of the porous film. For this reason, if the porous film is caused to undergo wet etching by phosphorous acid, etc. to widen the hole diameter before the oxide of the underlying layer is grown into the hole of the porous film, projection having large diameter can be also provided. Further, if the sample surface is polished before the porous film is removed to allow it to be planar surface, it is also possible to provide projection 25 having more planar upper surface and this is preferable. The projection grown in a direction perpendicular to the principal surface of the substrate is suitable for application such as magnetic recording media, etc. Here, the perpendicular direction referred to here is a direction which can be seen in the state where the bottom part of the projection and the top of the projection overlap with each other, and the other part is a part in the state where the substrate principal surface can be observed, when viewed from the top. The direction in the state where the top of the projection hides bottom part of other projection is excluded.

(3. Process Step for Disposing Magnetic Material)

Next, a process step for performing film formation of magnetic material serving as a recording layer with respect to uneven structure including an underlying layer 21 and regularly arranged projections 25 including oxide containing element constituting the underlying layer on a substrate 26 as shown in FIG. 5 will now be described.

Figure 6:
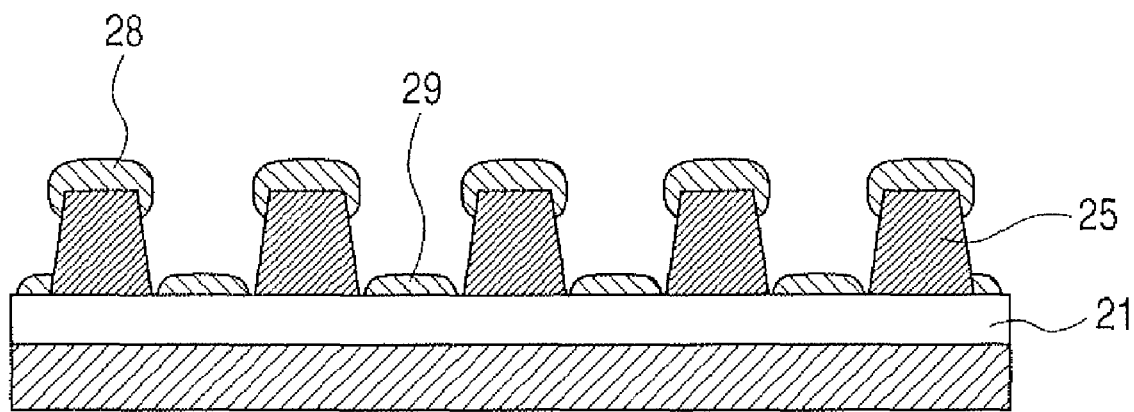
FIG. 6 is a model view illustrating an example of a magnetic recording medium according to the present invention.

Magnetic materials serving as a recording layer are formed as film so that they are disposed on the upper parts of regularly arranged projections 25. In this instance, it is desirable there results the state as shown in FIG. 6 such that the concave part between projections is not clogged by magnetic material disposed on the upper part of the projection 25. For this reason, it is preferable to form, as film, magnetic material by film formation, etc. having directivity to fly film formation particle from a predetermined direction with respect to the substrate. For example, there is conceivable a film formation process having directivity in a direction perpendicular to the substrate. Specifically, in the case of sputtering, lowering of gas pressure at the time of sputtering, elongating of the distance between the target and the sample, and disposing of collimator between target and sample, etc. are effective for improving directivity of sputter particles flying onto the sample.

Moreover, as shown in FIG. 6, there are instances where magnetic material 29 may be formed as film on the underlying layer 21 serving as the bottom part of the recessed part. In this case, the magnetic material 29 and the magnetic material 28 serving as recording part are both spatially and magnetically separated by the projection 25. Thus, there can be provided a patterned medium in which magnetic material 28 disposed on the upper part of the projection 25 is caused to serve as recording part.

As material of the magnetic material, materials as described below may be used for the purpose of realizing the perpendicular recording system. For example, there are multi-layered film of [Co/M] (M=Pt, Pd), and Co of the hcp (hexagonal closest packing lattice) in which the c-axis is oriented in a substrate perpendicular direction. Alternatively, there are materials having uniaxial magnetic anisotropy in a film surface perpendicular direction, such as, for example, M'Pt of L10 ordered structure in which the c-axis is oriented in the substrate perpendicular direction, or M'Pd (M'=Co, Fe), etc.

Figure 8:
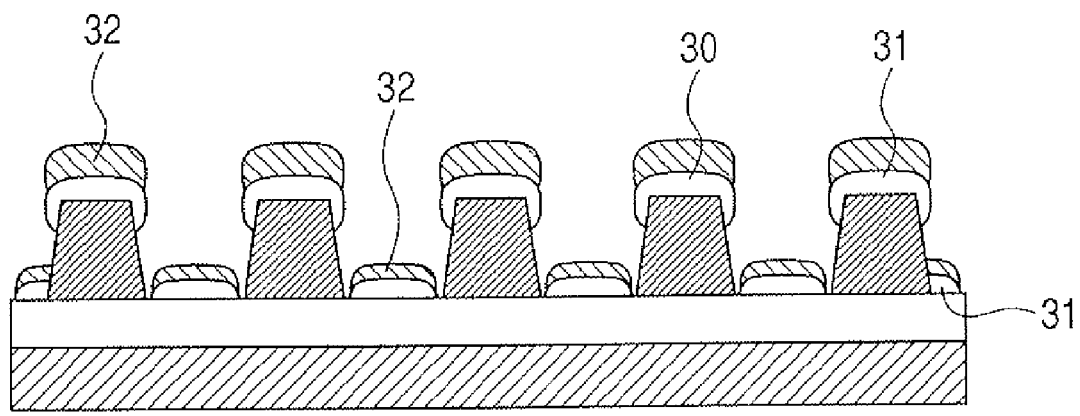
FIG. 8 is a model view illustrating underlying layer formed as film and magnetic material on the upper surface of projection and bottom part of recessed part.

Moreover, in the case where there is necessary a crystal-oriented magnetic material such as Co, M'Pt, or M'Pd (M'=Co, Fe), an orientation layer 30 aiming at performing orientation control may be disposed between the upper part of projection and magnetic material as occasion demands as shown in FIG. 8.

As stated above, in accordance with three process steps of "1. Anodic oxidation process step", "2. Process step of providing projection" and "3. Process step of disposing magnetic material", there is manufactured a patterned medium in which magnetic materials serving as a recording layer are disposed on the upper parts of regularly arranged projections.

(Phase Separation Film)

The phase separation film is a film in which in the case where film formation by sputtering is performed on a substrate by using target material including aluminum and silicon, silicon grows in a manner surrounding pillar-shaped aluminum.

By removing one phase constituting the phase separation film, there is provided a porous film. The phase separation film is structure represented by Al—Si, or Al—Ge based material, etc. Al cylinder stands in a substrate perpendicular direction, and its matrix is formed by $\alpha$-Si or $\alpha$-Ge. The phase separation film is described in the US Patent Application Publication No. 2005-0053773.

For example, let consider the case where phase separation film 9910 is provided on underlying layer 9900 as shown in FIGS. 19A to 19D.

Figure 19A:
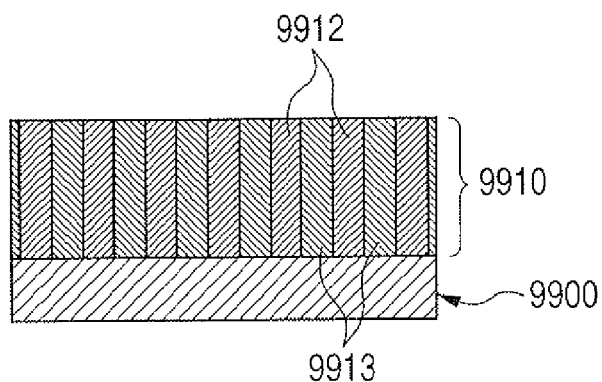
FIGS. 19A, 19B, 19C and 19D are views illustrating process steps for obtaining porous film by using phase separation film.
Figure 19B:
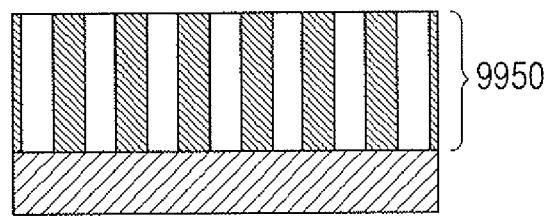
Figure 19C:
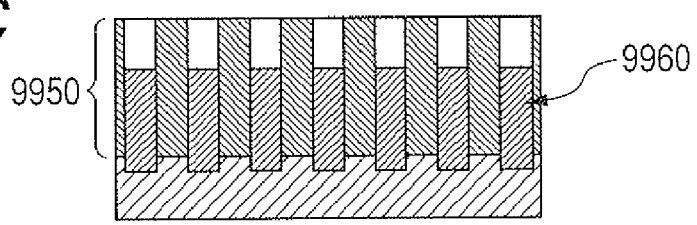

Only Al cylinder part 9912 may be selectively etched by acid or alkali such as ammonium aqueous solution, concentrated sulfuric acid or phosphoric acid, etc., and porous film can be provided by such means. Reference numeral 9913 indicates a silicon area surrounding cylinder of aluminum (FIGS. 19A, 19B).

Further, after cylinder of aluminum is removed by etching (FIG. 19B), the underlying layer is caused to undergo anodic oxidation (FIG. 19C) in the state where it is immersed in aqueous solution such as ammonium borate, ammonium tartrate or ammonium citrate, etc. to thereby have ability to grow oxide of the underlying layer 9960 such as Ti, Zr, Hf, Nb, Ta, Mo and W, etc.

Figure 19D:
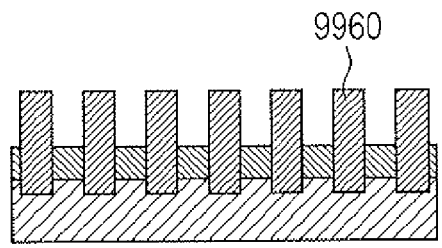

Thereafter, material constituting the porous film 9950 is selectively etched by sodium hydroxide, aqueous solution, hydrogen peroxide aqueous solution, etc., thereby making it possible to provide projection 9960 of the oxide which has been grown. In FIG. 19D, there is shown the case where a portion of the porous film 9950 is caused to remain in its thickness direction. It is a matter of course that the porous film may be also entirely removed as occasion demands.

EXAMPLES

Examples of the present invention will now be described.

First Example

This example relates to the fact that an uneven structure including regularly arranged projections is provided by anodic oxidation to dispose a magnetic material on the upper part of the projection.

Ti serving as underlying layer was formed as film on a Si substrate so that the film thickness became equal to 5 nm by sputtering, and AlTi containing Ti 10 atomic % was further formed as film on the Ti layer by sputtering so that the film thickness was equal to 100 nm.

Next, aluminum alkoxide was coated on the sample surface by the spin-coat process so that its thickness became equal to 20 nm. Subsequently, the sample was baked for 20 minutes at 90° C. thereafter to transfer concave part serving as starting point of anodic oxidation onto the alkoxide surface by the nano in-print method. In this example, mold in which projections having height of 15 nm were arranged in a triangular lattice formed at intervals of 50 nm was pressed onto the alkoxide surface to thereby transfer projections of the mold onto the alkoxide surface as a concave part serving as starting point of anodic oxidation.

Thereafter, as the result of the fact that arbitrary plural parts of the alkoxide surface were scanned by AFM (Atomic Force Microscope), projections of the mold were transferred on the alkoxide surface as concave part of about 5 nm.

Further, the sample was processed for 10 minutes at 180° C. by ashing using ultraviolet ray and ozone to remove a polymer part within the alkoxide, and to develop, at the same time, oxidation of aluminum part to oxidize the alkoxide layer.

Thereafter, anodic oxidation was performed at an applied voltage of 20 V within 0.3 mol/L sulfuric acid aqueous solution at a bath temperature of 16° C. The alkoxide layer which has been oxidized and the aluminum layer were caused to collectively undergo anodic oxidation. As the result of the fact that the sample which had been caused to undergo anodic oxidation was observed by the EF-SEM (Field Emission Scanning Electron Microscope), it was confirmed that a porous film of triangular lattice arrangement had been formed similarly to the pattern of projections of the mold.

Moreover, anodic oxidation was continued until the bottom part of the barrier layer reached the underlying layer to thereby grow oxide of Ti serving as underlying layer from the underlying layer toward the hole.

Next, the sample was immersed on NaOH aqueous solution of 0.1 mol/L for 5 minutes at a bath temperature of 23° C. to thereby remove the porous film. Thus, there was provided an uneven structure in which oxides of the underlying layer were left as projections arranged in a triangular lattice formed at intervals of 50 nm. The projection is pillar projection having height of about 25 nm and diameter of about 20 nm.

Next, film formation of magnetic material was performed with respect to the uneven structure thus obtained to dispose magnetic material on the upper part of projection. Film formation of the magnetic material was performed by sputtering. Specifically, such film formation was performed at an applied power of DC 50 W under argon gas 0.1 Pa atmosphere with respect to Co target having diameter of 5 cm with the distance between target and sample being set to 15 cm. Film formation was performed so that the film thickness of Co on the upper part of the projection became equal to 10 nm. Thereafter, as the result of the fact that the cross section of the sample was observed by the FE-SEM, the state where magnetic materials 28 were formed as film on the upper parts of projections 25 regularly arranged on the underlying layer 21 as shown in FIG. 6 was observed. Moreover, the magnetic material 29 formed as film on the underlying layer 21 had a film thickness thinner than that of the magnetic material 28 formed as film on the upper part of the projection 25, e.g., its film thickness was about 5 nm.

As stated above, it was confirmed that magnetic materials were disposed on the upper parts of regularly arranged projections which had been provided by anodic oxidation. Since the regularly arranged projections made by this example are formed of oxide of underlying layer, tolerance to film formation and thermal treatment is excellent. Further, since the uneven structure including regularly arranged projections is made by nano in-print using resin and anodic oxidation in combination, it is possible to easily manufacture even high density pattern.

Second Example

This example relates to the fact that an uneven structure including regularly arranged projections is provided by anodic oxidation to dispose magnetic material on the upper part of the projection. Particularly, unlike the first example, an orientation layer is disposed between the upper part of the projection and the magnetic material to thereby control crystal orientation of the magnetic material.

Figure 7:
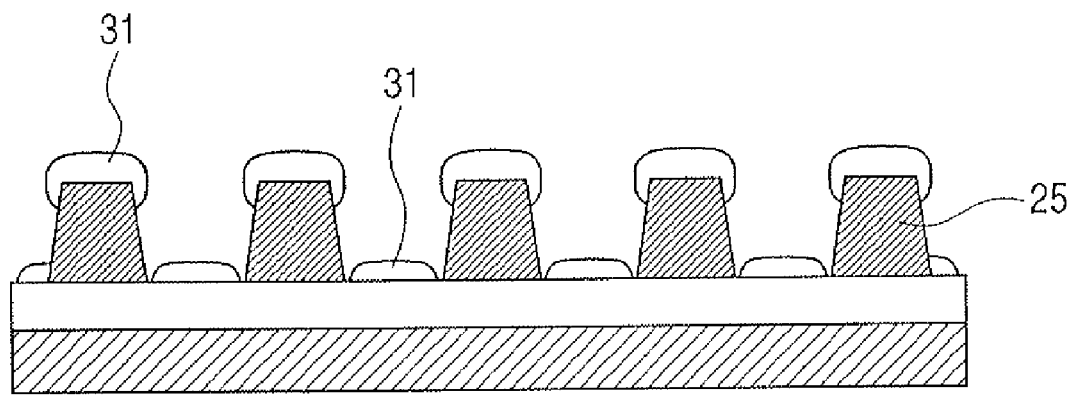
FIG. 7 is a model view illustrating underlying layer formed as film on the upper surface of projection and bottom part of recessed part.

First, similarly to the first example, an uneven structure was prepared by making use of anodic oxidation. Next, MgO functioning as an orientation layer of the magnetic material was formed as film by sputtering. Sputtering was performed at an applied power of RF 50 W under argon gas 0.1 Pa atmosphere with respect to MgO target having diameter of 5 cm with the distance between the target and the sample being set to 15 cm. Film formation was performed so that the film thickness of MgO on the upper surface of the projection became equal to 5 nm. As the result of the fact that the cross section of the film-formed sample was observed by the FE-SEM, there was the state where MgO 31 was formed as film mainly on the upper surface and the recessed part of the projection 25 as shown in FIG. 7, and MgO was hardly formed as film on the side wall of the projection. Moreover, as the result of the X-ray analysis of the sample, it was confirmed that MgO was oriented in the state where the surface thereof included crystal face of (001).

Next, similarly to the first example, film formation of magnetic material was performed by sputtering. In this example, FePt was used as target and film formation was performed so that composition ratio of Fe within the film was 50 atomic % and the film thickness was 10 nm. As the result of the fact that the cross section of the film-formed sample was observed by the FE-SEM, the state where FePt 32 was formed as film on the MgO 31 serving as the orientation layer 30 in a form as shown in FIG. 8 was observed.

Further, annealing was performed with respect to the film formed sample at 500° C. in vacuum. In the sample after undergone annealing, FePt was brought into the state where the c-axis of the L10 structure was oriented in a substrate perpendicular direction by the influence of MgO (001) plane serving as underlying layer of magnetic material. Moreover, magnetic anisotropy in a direction perpendicular to the substrate was confirmed from magnetization curve of sample.

As stated above, orientation layer may be disposed between the upper part of projection and magnetic material to thereby control crystal orientation of magnetic material. By disposing magnetic material having magnetic anisotropy in a perpendicular direction on the upper part of regularly arranged projections as in this example so that a perpendicular type patterned medium in which magnetic material disposed on the upper part of projection is caused to serve as recording part can be manufactured.

Third Example

This example relates to the fact that an uneven structure including regularly arranged projections is provided by anodic oxidation to dispose magnetic material on the upper part of the projection. Particularly, this third example relates to the case where oxide of underlying layer has been grown into the hole of the porous film in the above-described first example.

First, similarly to the first example, anodic oxidation was performed to form porous films arranged in triangular form. It is to be noted that Nb was utilized as material of the underlying layer in this example unlike the first example. Next, the porous film thus obtained was immersed for 20 minutes in 5 wt % phosphoric acid aqueous solution at a bath temperature of 22° C. to thereby perform hole diameter enlargement processing by wet etching. As the result of the fact that the plane of the sample was observed, the hole diameter before hole diameter enlargement processing of 20 nm was enlarged into 35 nm.

Figure 9:
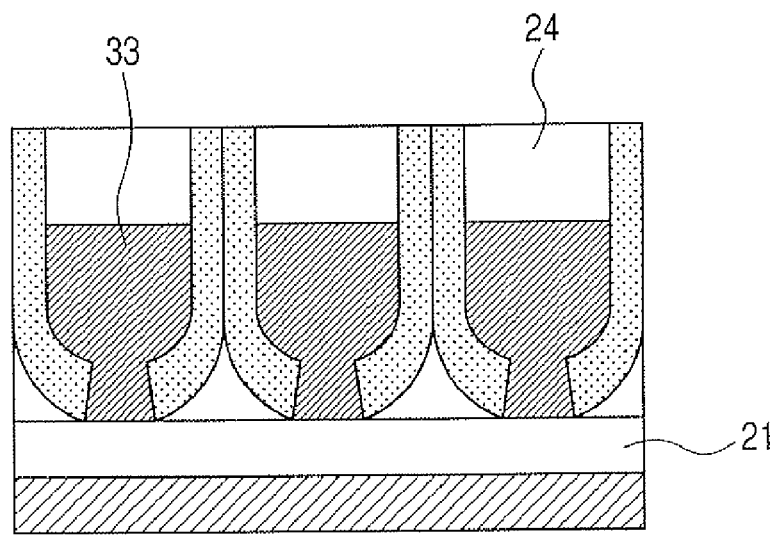
FIG. 9 is a model view illustrating the state where oxide of underlying layer has grown up to the inside of hole of porous film.

Next, the sample was caused to undergo anodic oxidation at an applied voltage of 40 V in 0.15 mol/L ammonium borate aqueous solution at a bath temperature of 22° C. Thus, as the result of the fact that growth of oxide of the underlying layer was developed so that volume expansion was performed, oxide 33 of Nb as oxide of the underlying layer 21 was filled and formed within the holes 24 as shown in FIG. 9. In this instance, the oxide of Nb which had grown by anodic oxidation in ammonium borate aqueous solution had a height of 50 nm.

Figure 10:
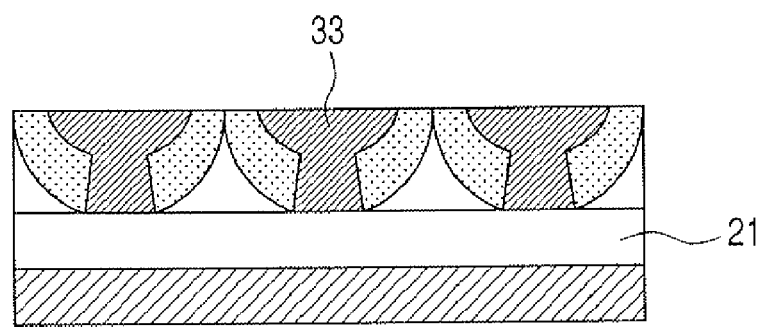
FIG. 10 is a model view illustrating cross section of a sample after surface polishing is performed.
Figure 11:
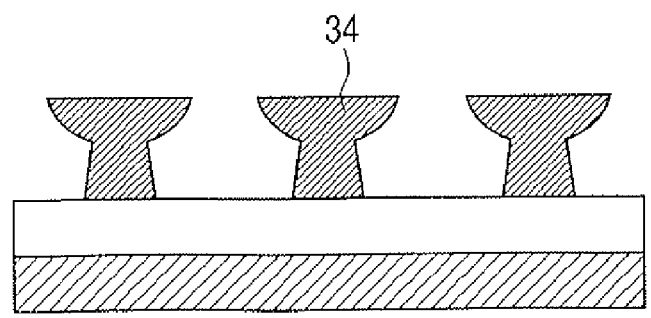
FIG. 11 is a model view illustrating regularly arranged projections including oxide of underlying layer.

Further, the surface of the sample was polished by diamond slurry to simultaneously polish porous film and oxide of Nb so that there resulted the state of FIG. 10. In this state, similarly to the first example, the porous film was removed to thereby provide an uneven structure including projections 34 as shown in FIG. 11. Since the upper surface of the projection 34 thus obtained is surface-polished differently from the first example, such uneven structure has smooth surface. Moreover, while the diameter of the upper surface of the projection 34 was 35 nm which was larger than that of the first example, such diameter can be adjusted by time of the hole diameter enlargement processing. Further, while the height of the projection 34 was 40 nm, it can be adjusted depending upon time of surface polishing.

Next, as the result of the fact that film formation was performed with respect to the uneven structure thus obtained similarly to the first example, it was confirmed that magnetic materials were disposed on upper parts of regularly arranged projections similarly to the first example.

By growing, by anodic oxidation, oxide of the underlying layer within holes of porous film as in this example, dimension such as diameter or height of projection can be changed. Moreover, the upper surface of projection, on which magnetic film is disposed, serving as a recording layer can be also planarized.

Fourth Example

This example relates to the fact that there is provided an uneven structure including regularly arranged projections by anodic oxidation to dispose magnetic materials on upper parts of the projections. Particularly, the fourth example relates to the case where oxide of the underlying layer has been grown into holes of the porous film in the first example.

First, anodic oxidation was performed to form a porous film arranged in tetragonal lattice form. The fourth example differs from the first example in that Nb was formed as film on Ti having thickness of 5 nm so that film thickness became equal to 30 nm, and AlHf of 60 nm thickness containing Hf 7 atomic % was further sputtered on the Nb film. Moreover, there was formed a tetragonal arrangement including small concave parts as the starting points of anodic oxidation at intervals of 25 nm on the AlHf surface by using the FIB method. Further, anodic oxidation was performed at an applied voltage of 10V in 1.0 mol/L sulfuric aqueous solution at a bath temperature of 3° C. to subsequently immerse the porous film thus obtained into 5 wt % phosphorous acid aqueous solution at a bath temperature of 20° C. to thereby perform hole diameter enlargement processing by wet etching. As the result of the fact that the plane of the sample was observed by the FE-SEM, hole diameter was 12 nm.

Next, the sample was caused to undergo anodic oxidation at an applied voltage of 25 V in 0.15 mol/L ammonium borate aqueous solution at a bath temperature of 22° C. Thus, growth of oxide of the underlying layer was developed to perform volume expansion so that oxide 33 of Nb as oxide of the underlying layer 21 was filled and formed within holes 24 as shown in FIG. 9.

Next, heat treatment of 350° C. was performed under atmospheric condition.

Further, the surface of the sample was polished to thereby simultaneously polish the porous film and oxide of Nb.

Next, the porous film was removed in 5 wt % phosphoric acid aqueous solution at 25° C. similarly to the first example to thereby provide an uneven structure A including projections having diameter of 12 nm, and height of 25 nm.

On the other hand, as comparative sample, there was prepared an uneven structure in which no heat treatment was performed. The uneven structure B also has diameter of 12 nm and height of 25 nm.

Here, as the result of the fact that strength comparison by ultra-sonic wave processing was performed under the same condition for strength comparison between the uneven structures A and B, a portion of the projection of the uneven structure B was collapsed, but the uneven structure A was stable. Thus, it has been seen that the uneven structure A is stable structure. Also with respect to the structure having large aspect ratio between the diameter and the height, stable uneven structure was provided.

Moreover, as the result of the fact that film formation of the magnetic materials was performed onto the uneven structure A similarly to the first example, it was confirmed that magnetic materials were disposed on upper parts of regularly arranged projections similarly to the first example.

Fifth Example

Preparation of convex Part of NbO by Anodic Oxidation

This example relates to a manufacturing method of oxidizing an underlying layer formed on a member by anodic oxidation process to provide a convex structure in which diameter has been enlarged toward the outside of the member. Description will be given in accordance with FIGS. 12A to 12G, and FIGS. 13A to 13E.

Figure 12A:
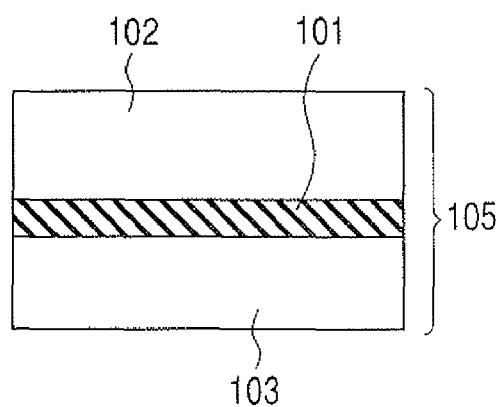
FIGS. 12A, 12B, 12C, 12D, 12E, 12F and 12G are process diagrams illustrating a method of manufacturing convex structure of which hole diameter has been extended toward the outside of a member by anodic oxidation of a fifth example of the present invention.

An underlying layer 101 including niobium (Nb) having thickness of 30 nm is formed on a silicon substrate 103. Further, an anodic-oxidized layer 102 including aluminum-hafnium alloy (AlHf, Hf=5 to 6 atomic %) having thickness of 80 nm is further formed to allow the anodic oxide film thus formed to be a member 105 (FIG. 12A).

Figure 12D:
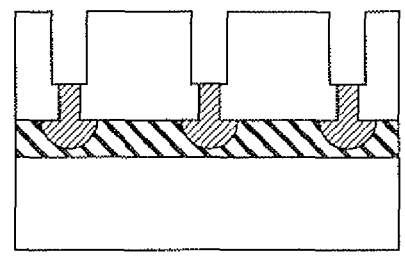
Figure 12B:
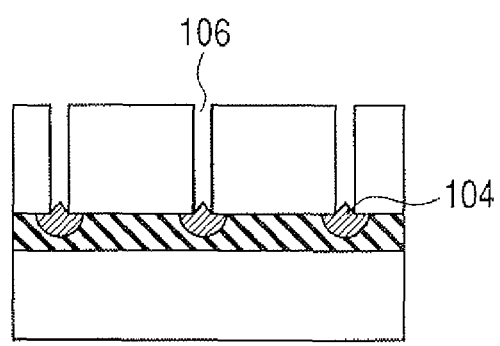
Figure 12E:
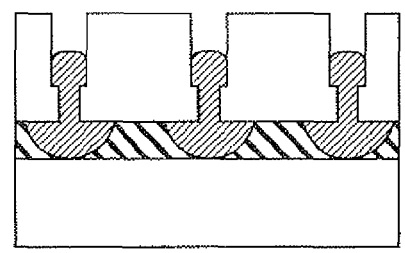

Next, this member is immersed into sulfuric aqueous solution (1 mol/L, 20° C.) as anode to apply a voltage thereto electrode to form holes 106 at the AlHf alloy layer (FIG. 12B). At this time, Nb close to the hole bottom part is oxidized so that there results Nb oxide. The Nb oxide thus obtained is protruded into the hole. Here, since arrangement of holes becomes random in general in the case of formation of hole by anodic oxidation, it is necessary to combine such hole formation technique with a technique such as the Japanese Patent Application Laid-Open No. 2004-66447, etc.

Next, a process step of immersing the member into ammonium borate aqueous solution (0.15 mol/L, 20° C.) to apply a voltage as anode and a pore-wide process step of widening hole diameter of the part where no Nb oxide convex structure is formed are repeatedly performed. Thus, there is formed a Nb oxide convex structure of which diameter has been increased toward the outside of the member. In this case, the height of the Nb oxide is proportional to a voltage applied thereto.

Figure 12C:
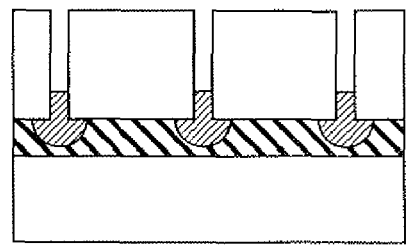
Figure 12F:
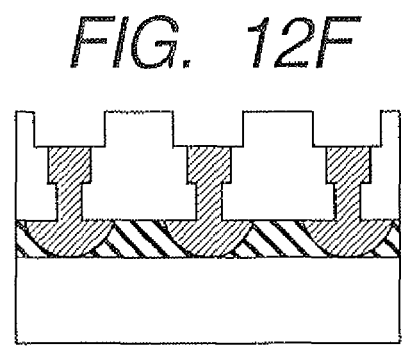
Figure 12G:
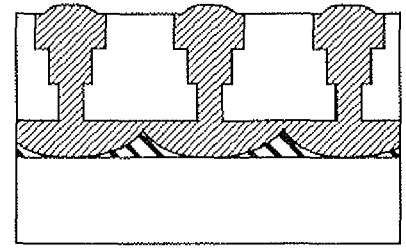

First, a voltage of 11 V is applied to grow Nb oxide (FIG. 12C). After application of the voltage is stopped, the member is immersed into phosphoric aqueous solution (5 wt %, 20° C.) for 10 minutes to enlarge the hole diameter (FIG. 12D). Since liquid is difficult to be admitted into the part where Nb oxide is formed, hole diameter is also difficult to be enlarged. Next, the member is immersed into the ammonium borate for a second time to apply voltage of 19 V (FIG. 12E) to immerse that member into phosphoric aqueous solution for ten minutes again (FIG. 12F). Further, the member is immersed into the ammonium borate for a second time to apply a voltage of 27 V (FIG. 12G). As a result, there is provided Nb oxide having height of 50 nm and shape such that according as the distance from the member becomes large, the diameter gradually increases. The shape of hole after undergone enlargement processing does not result in clear step-shape.

Figure 13A:
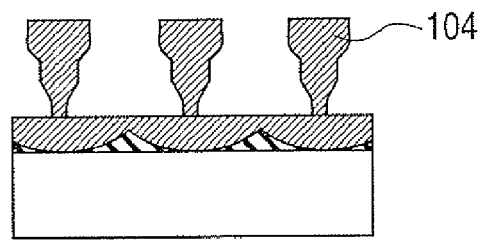
FIGS. 13A, 13B, 13C, 13D and 13E are process diagrams illustrating a method of filling gaps of convex structure and manufacturing magnetic recording medium of the fifth example of the present invention.
Figure 13B:
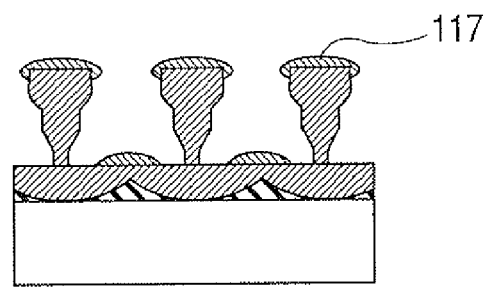

Next, the Nb oxide is baked for 10 minutes at 300° C. to enhance strength of the Nb oxide. Since the shape of the Nb oxide upper surface is somewhat round at this time point, the Nb oxide is polished by colloidal silica until the Nb oxide upper surface is exposed and is planarized. Further, when this member is immersed in phosphoric aqueous solution for five hours, AlHf alloy is dissolved so that only Nb oxide convex structure remains (FIG. 13A). Ruthenium (Ru) of 5 nm, and cobalt-platinum alloy (CoPt) are deposited in order recited by sputtering process to provide a magnetic recording layer. When there is employed a condition such that sputtering is implemented to substrate from a vertical direction, magnetic recording layer is easy to be deposited within recessed part between Nb oxide upper surface and Nb oxide, and is difficult to be deposited on the Nb oxide side wall. For this reason, it is possible to realize separation of magnetic recording layers between Nb oxide convex structures.

Figure 13C:
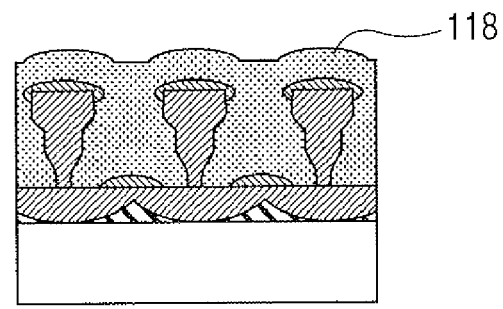
Figure 13D:
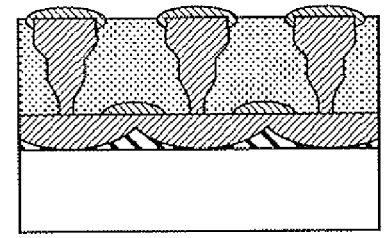
Figure 13E:
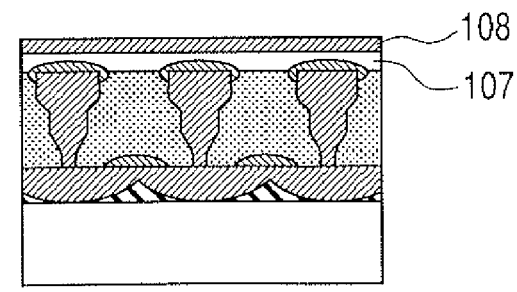

In order to use such a structure as a magnetic recording medium, subsequent process steps as described below are required. First, SOG (Spin-On-Glass) is coated by the spin-coat process and is then baked to fill gaps of Nb oxide convex structure (FIG. 13C). Dry etching method is performed by using fluorine-based gas to remove only the SOG from the upper part to expose a magnetic recording layer 117 (FIG. 13D). Diamond Like Carbon (DLC) is deposited as a protective layer so that its thickness becomes equal to 3 nm, and a lubricant is further laminated so that its thickness becomes equal to 5 nm (FIG. 13E).

Sixth Example

Metallic Plating

In the fifth example, the case where material constituting convex structure is metal is illustrated.

This example relates to the fact that underlying layer 101 is formed of copper (Cu) in the configuration of the member in the fifth example. When anodic oxidation is performed under similar condition, Cu layer is exposed when hole 106 reaches the underlying layer. By using this exposed part as electrode, a member is immersed within platinum electrical plating bath to perform electric plating with such electrode being as cathode. Since the growth height of the convex structure is determined by plating time, plating of a predetermined time and hole diameter enlargement processing are repeatedly performed. Since the plating bath is typically acid in many cases, it is preferable to select material of the plating bath by which anodic-oxidized layer is not corroded. Moreover, material of a convex structure to be fabricated can be a material which is not corroded by phosphoric aqueous solution in removing the anodic-oxidized layer.

Seventh Example

The Case Using Phase Separation Film

This example relates to a method of manufacturing magnetic recording medium in the case where phase separation film is used.

Nb serving as an underlying layer is formed as film on a Si substrate so that its film thickness becomes equal to 10 nm, and Al—Si phase separation film and Al—Ge phase separation film are formed as film so that composition of Al includes 40 atomic % and 60 atomic % and its thickness becomes equal to 50 nm.

Next, Al—Si phase separation film is immersed into concentrated sulfuric acid, and Al—Ge phase separation film is immersed into phosphoric acid to dissolve only the Al cylinder part. Thereafter, it can be confirmed that the phase separation film is a porous film including Al part as hole and including holes perpendicular to the substrate.

Further, each phase separation films are immersed into 0.15 mol/L ammonium borate aqueous solution at 22° C. Then, anodic oxidation is performed at an applied voltage of 20V. As a result, it can be confirmed that oxide of the underlying layer Nb is grown within thin holes of the porous film at a height of about 25 nm irrespective of whether it is made by either Al—Si phase separation film or Al—Ge phase separation film.

Thus, the porous anodic oxide part obtained from the Al—Si phase separation film and Al—Ge phase separation film is selectively removed by sodium hydroxide aqueous solution, thereby making it possible to obtain projection of niobium oxide. Moreover, in the case where the Al—Ge phase separation film is starting material, it can be confirmed the porous anodic oxide material can be effectively dissolved even by hydrogen peroxide aqueous solution.

Since the thin hole diameter of these films is 5 nm in the case of the Al—Si phase separation film, and is 10 nm in the case of the Al—Ge phase separation film, magnetic layers of other examples are formed, thereby enabling manufacture of a high density recordable magnetic recording medium.

Eighth Example

Constriction

This example relates to a manufacturing method of oxidizing an intermediate layer which has been formed at a member by the anodic oxidation process to provide a convex structure in a form of constriction toward the outside of the member. Description will be given in accordance with FIG. 14.

Figure 14A:
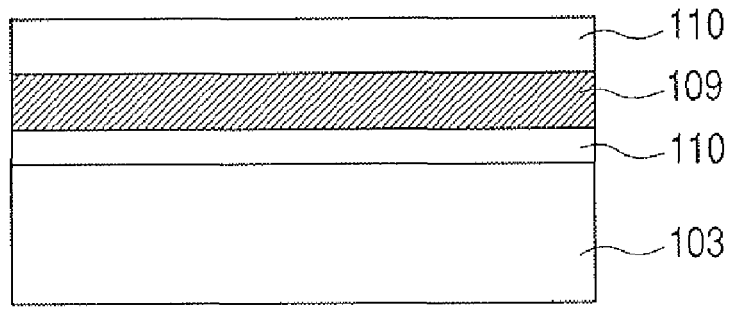
FIGS. 14A, 14B, 14C and 14D are process diagrams illustrating a manufacturing method of oxidizing intermediate layer formed at member by anodic oxidation process of a seventh example of the present invention to provide convex structure having a shape constricted toward the outside of member.
Figure 14B:
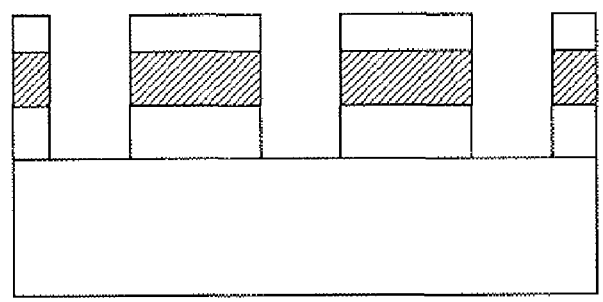
Figure 14C:
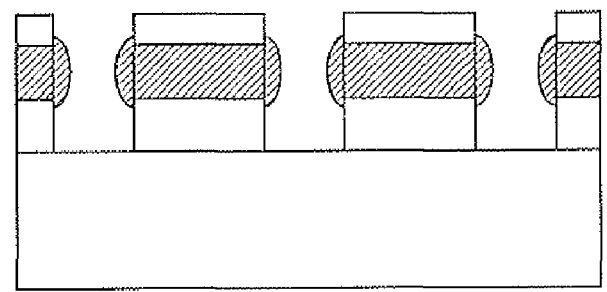
Figure 14D:
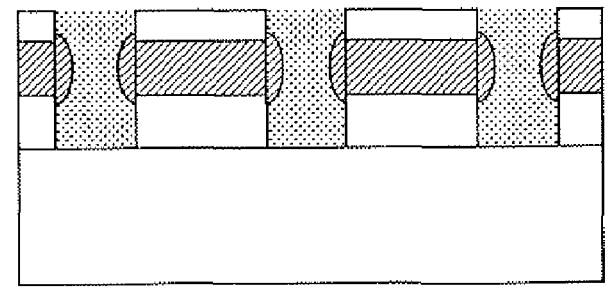

Titanium (Ti) of 10 nm and Al oxide of 10 nm are disposed as an oxide 110 on a silicon substrate 103, Nb of 30 nm is disposed as an intermediate layer 109, and Al oxide of 15 nm further is disposed as oxide layer. This layered structure is caused to be a member (FIG. 14A). Hole structure regularly arranged in a triangular lattice form at intervals of 50 nm on the Nb layer and the Al oxide layers by the photolithography process is formed (FIG. 14B), and is immersed into ammonium borate as anode to apply a voltage of 10 V. Current is caused to flow in the Al oxide layer. As a result, the Nb layer is oxidized so that volume is expanded. The oxidized Nb layer is projected toward the side surface of hole (FIG. 14C). When filler is filled within hole, and the material thus obtained is immersed into phosphoric aqueous solution to dissolve and remove the Al oxide layer, constricted convex structure of filler remains (FIG. 14D).

Ninth Example (Preparing inverse taper type hole by in-print. After magnetic material is deposited, polymer is removed or after polymer is removed, magnetic material is deposited).

This example relates to a manufacturing method of forming, by the in-print method, concave structures in which the width is enlarged toward the outside of the member to oxide, by anodic oxidation process, an underlying layer formed on a member to provide a convex structure of which width has been extended toward the outside of the member. Description will be given in accordance with FIGS. 15A to 15D.

Figure 15A:
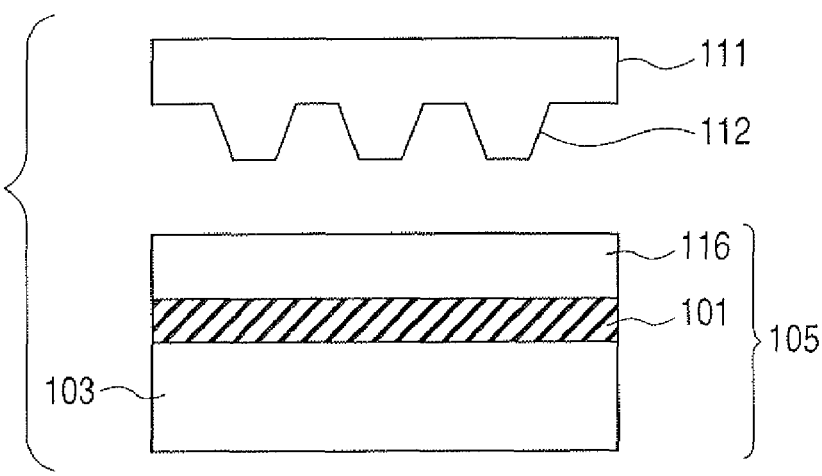
FIGS. 15A, 15B, 15C and 15D are process diagrams illustrating a manufacturing method of oxidizing underlying layer formed on member by anodic oxidation process of an eighth example of the present invention to provide convex structure of which width has been enlarged toward the outside of member.

An underlying layer 101 including Nb having thickness of 30 nm is formed on a silicon substrate 103 to further form a transfer layer 116 including polymethylmethacrylate (PMMA) layer having thickness of 100 nm to allow the transfer layer 116 thus obtained to be a member 105 (FIG. 15A). Moreover, there is fabricated mold 111 (FIG. 16: perspective view of mold) including Si having convex parts in which trapezoidal line structure is arranged in a rectangular lattice form.

Figure 15B:
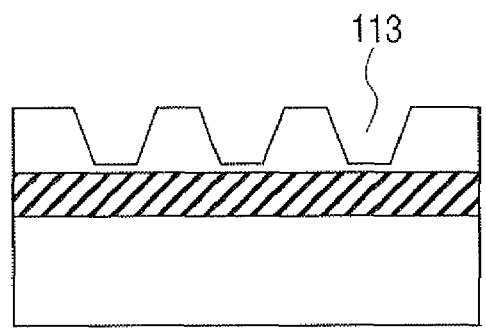
Figure 15C:
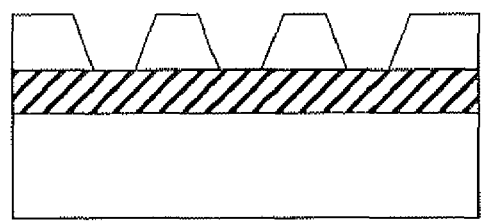

The member is maintained at a room temperature, and the mold is heated at 130° C. The mold is pressed onto the PMMA layer to maintain it for one minute thereafter to cool the mold to subsequently peel it thus to form a concave structure 113 (FIG. 15B). The shape of the concave structure thus formed is substantially equal to mold projection 112 form. The remaining film of the PMMA layer is removed by the dry etching process using oxygen plasma to expose the Nb layer toward the concave structure 113 (FIG. 15C).

Figure 15D:
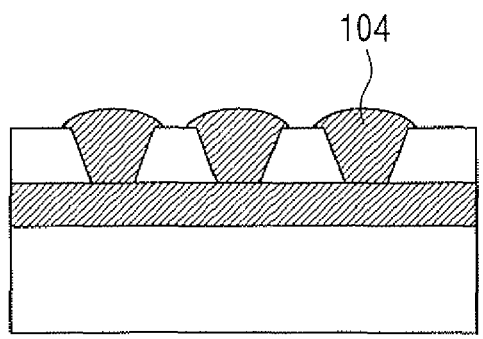
Figure 16:
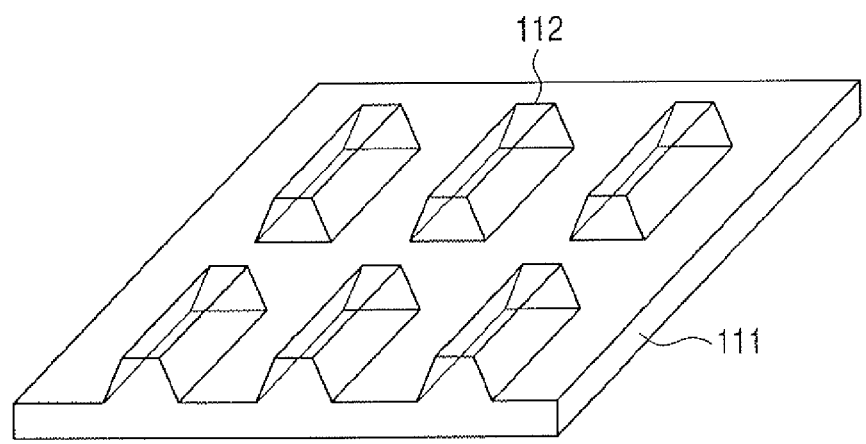
FIG. 16 is a perspective view of mold used in the eighth example of the present invention.

Next, the member 105 is immersed into ammonium borate as anode to apply a voltage thereto to form oxide 104 of the underlying layer including Nb oxide (FIG. 15D). Further, the oxide 104 thus formed is polished to planarize the Nb oxide layer upper surface thereafter to immerse it into acetone to dissolve and remove the PMMA layer. Thus, there is provided a convex structure in line form and having width increased toward the outside of the member. Although transfer unevenness slightly takes place in the in-printed PMMA, the convex structures obtained by this method have uniform height because oxide is formed at a height proportional to voltage and is further polished.

In the case where such convex structure is used as a magnetic recording medium, the PMMA layer is removed thereafter to deposit CoPt to provide a magnetic recording layer. Alternatively, CoPt may be deposit after polishing thereafter to dissolve PMMA to remove only CoPt on the PMMA.

Tenth Example

Forming Inverse Taper Convex Part by In-print Itself to Deposit Magnetic Layer

This example relates to a manufacturing method of providing, by the in-print method, a convex structure of which width is extended toward the outside of the member. Description will be given in accordance with the FIGS. 17A and 17B, and FIG. 18.

The transfer layer 116 including silsesquioxane (HSQ) layer having thickness of 100 nm is formed on the silicon substrate 103 to provide a member 105 (FIG. 17A). Moreover, there is fabricated mold 111 (FIG. 18: perspective view of mold) including polydimethylsiloxane (PDMS) including recessed parts in which trapezoidal line structure is arranged in rectangular lattice form.

The member is pre-baked at 60° C. to coat release agent onto the mold to press it onto the HSQ layer at a room temperature to maintain the mold for one minute thereafter to bake it for one minute at 150° C. to completely evaporate solvent of HSQ layer to harden the member thus obtained thereafter to release it. Further, when the member thus obtained is exposed to ozone atmosphere while baking it at 200° C., oxidation is further developed. Thus, convex structure 115 of oxide silicon is formed (FIG. 17B). Since the in-print mold by PDMS has elasticity, the opening part of a mold recessed part 114 is deformed in releasing the mold so that the upper part of the convex structure 115 having width broader than that of the mold opening part can be also peeled. Thus, there can be formed convex structure of which width increases toward the outside of the member.

In accordance with the method of manufacturing magnetic recording medium of the present invention, since shape and height of convex part forming magnetic material serving as recording part can be uniformly formed over large area, this manufacturing method can be utilized for the field of information storage by high density magnetic recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-220560, filed Aug. 11, 2006, 2007-

050376 filed Feb. 28, 2007, 2007-137226 filed May 23, 2007 and 2007-204705 filed Aug. 6, 2007 which are hereby incorporated by reference herein in their entirety.

What is claimed is:

1. A patterned medium comprising magnetic recording layers,
   wherein plural convex members are provided in an array form on a substrate,
   each of the convex members has a shape such that cross section at each plane in parallel to the substrate tapers toward the substrate, and
   the magnetic recording layers are provided on upper surface parts of the convex members in a manner that the upper surface parts adjacent to each other are spatially separated from each other, wherein the magnetic recording layers provided on the upper surface parts are not in contact with each other between the adjacent upper surface parts.

2. The patterned medium according to claim 1, wherein the convex member is comprised of oxide, resin or metal.

3. The patterned medium according to claim 1, wherein the convex member has a height less than 30 nm.

4. The patterned medium according to claim 3, wherein the convex member has a height from 5 nm to 29 nm.

5. The patterned medium according to claim 1, wherein the difference in level between the adjacent upper surface parts is less than 5 nm.

6. The patterned medium according to claim 1, wherein an orientation film intervenes between the magnetic recording layer and the upper surface part of the convex member.

7. The patterned medium according to claim 1, wherein a soft magnetic under layer is provided between the substrate and the convex member.

8. The patterned medium according to claim 1, wherein the magnetic recording layer is not provided on the side surface of the convex member.

9. The patterned medium according to claim 1, wherein a material comprised in the magnetic recording layer is provided on the substrate between the convex members.

* * * * *